Nov. 24, 1925.
H. TREES
1,562,812
VARIABLE CONDENSER
Filed March 26, 1924
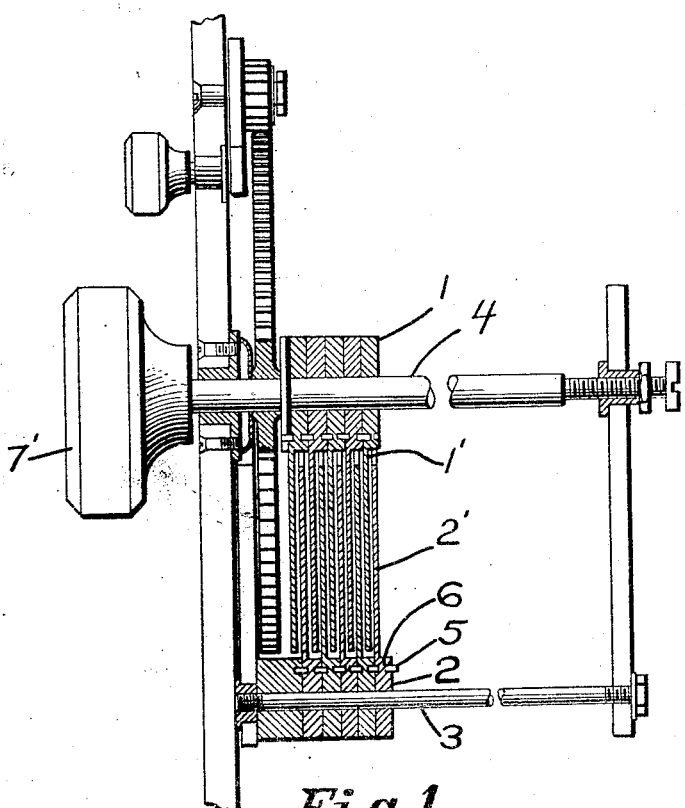
Fig.1.
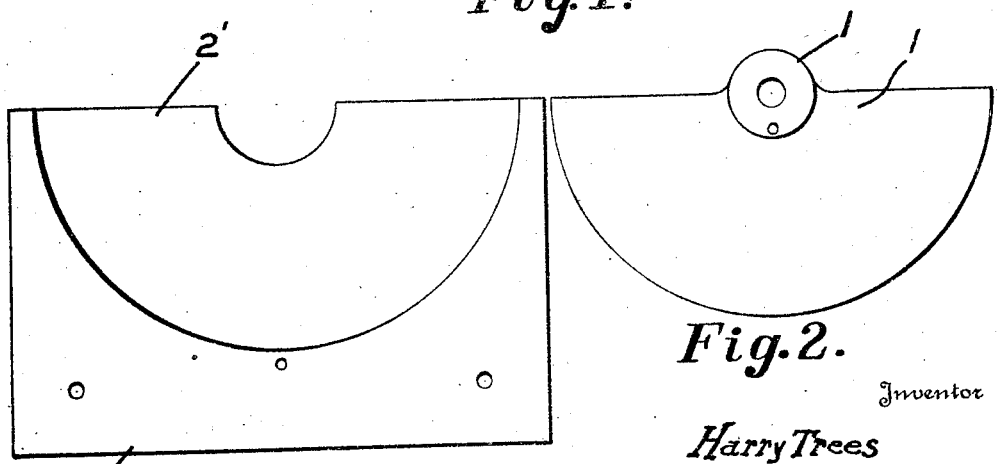
Fig.2.
Fig.3.
Inventor
*Harry Trees*
By  Attorney Patented Nov. 24, 1925.

1,562,812

UNITED STATES PATENT OFFICE.

HARRY TREES, OF CAMP ALFRED VAIL, NEW JERSEY.

VARIABLE CONDENSER.

Application filed March 26, 1924. Serial No. 701,958.

*To all whom it may concern:*

Be it known that I, HARRY TREES, a citizen of the United States, residing at Camp Alfred Vail, in the county of Monmouth and State of New Jersey, have invented certain new and useful Improvements in Variable Condensers, of which the following is a specification.

This invention relates in general to electric plate condensers and more particularly to variable capacity plate condensers wherein one set of plates are held stationary while the other set is movable and so mounted as to be brought to a greater or lesser extent alternately between the stationary set, for the purpose of varying the capacity of the apparatus.

It is an object of this invention to provide a variable condenser capable of the maximum efficiency in operation and which can be manufactured at the minimum expense.

It is a further object to provide such a condenser which will consist of the minimum number of parts of a standard size so as to be interchangeable and the complete device assembled with the greatest ease.

I am aware that it is old in the art to provide a variable condenser in which the stationary and variable plates are spaced apart by spacing elements introduced between each stationary and movable plate at their respective supporting shaft. It is also old to attempt such spacing by casting entire sets of movable and stationary plates, there being a space provided between each plate of each set.

It is proposed in the present invention to provide a variable condenser in which each of the plates of the movable and stationary set are separately formed and so machined that the spacers are integral with each plate. In order to accomplish this it is proposed to machine each plate so that the portion of the plate surrounding the shaft on which it is mounted is of a comparatively greater width than the remainder of the effective area of the plate. This presents an effective spacing means and obviates the necessity of introducing additional spacing elements.

With the foregoing and other objects in view, the invention consists in the combination of parts and in the details of construction hereinafter described and claimed, certain embodiments being illustrated in the accompanying drawings, in which—

Figure 1 is a view in vertical longitudinal section through the variable condenser assembly;

Figure 2 is a view in front elevation of a rotary plate unattached;

Figure 3 is a similar view of a stator plate unattached.

Referring more particularly to the drawings, the rotor plates 1 are mounted on a rotary shaft 4 while the stator plates 2 are mounted on the stationary shaft 3.

By reference to Figure 1 it will be seen that respective widths of the rotor and stator plates 1 and 2 are substantially reduced at 1' and 2', their effective areas.

Each of the rotor and stator plates is provided, in its wider portion, with a pin 5 fixed in one side so as to engage a hole 6 in the other side of the adjacent plate, in order to avoid relative movement of the plates mounted on the same shaft.

A suitable knob 7 may be provided for rotating the shaft 4 and consequently the set of rotor plates 1.

In this manner of assembly the necessity of individual spacing elements is eliminated as the difference in the widths in each plate of its point of application to its shaft and the effective area of the plate effects a highly satisfactory spacing means.

The object in making the stator plate in the particular form shown in Figure 3 is that in the manufacture of same I propose to take a bar of stock of suitable shape for making the stator plate, and after machining same, cut the plate in half, thus making two stator plates in one machine operation and also their corresponding spacing means out of one piece of stock.

It will be readily seen that by the proposed construction a variable condenser has been provided which will be capable of permanent and efficient operation and which consists in the minimum number of parts easily assembled and readily replaced and interchangeable.

I claim:

A variable condenser comprising a plurality of separately formed rotor and stator plates, said rotor and stator plates being mounted on a rotatable and fixed shaft respectively, each of said rotor and stator plates having a portion, adjacent their respective shafts, of substantially greater thickness than that of the main electrically effective area of said plates for the purpose of spacing said plates, each of said rotor and stator plates having a pin formed integrally therewith and adapted to engage a corresponding groove in the adjacent rotor and stator plate respectively to insure against relative rotation between said rotor plates and between said stator plates, means for rotating said rotor plates to bring the latter to a greater or lesser degree between said stator plates, for the purpose of varying the capacity of said condenser.

In testimony whereof I affix my signature.

HARRY TREES.